United States Patent [19]
Walton

[11] Patent Number: 5,749,059
[45] Date of Patent: May 5, 1998

[54] APPARATUS AND METHOD FOR CONTROLLING AN ACTUATABLE RESTRAINT DEVICE

[75] Inventor: Karl D. Walton, Rowland Heights, Calif.

[73] Assignee: TRW Technar Inc., Irwindale, Calif.

[21] Appl. No.: 528,427

[22] Filed: Sep. 14, 1995

[51] Int. Cl.$^6$ .................................................. B60R 21/32
[52] U.S. Cl. .................................... 701/45; 701/47; 280/735
[58] Field of Search ........................ 364/424.055, 424.057; 280/735; 307/10.1

[56] References Cited

U.S. PATENT DOCUMENTS

| | | | |
|---|---|---|---|
| 3,687,213 | 8/1972 | Sato et al. | 180/82 |
| 3,964,016 | 6/1976 | Yamada et al. | 340/52 H |
| 4,366,465 | 12/1982 | Veneziano | 180/274 |
| 4,381,829 | 5/1983 | Montaron | 180/274 |
| 4,614,876 | 9/1986 | Mattes et al. | 307/105 B |
| 4,977,623 | 12/1990 | DeMarco | 2/69 |
| 5,072,966 | 12/1991 | Nishitake et al. | 280/730 |
| 5,225,986 | 7/1993 | Mickeler et al. | 364/424.05 |
| 5,357,141 | 10/1994 | Nitschke et al. | 307/10.1 |
| 5,387,819 | 2/1995 | Ueno | 307/10.1 |
| 5,482,314 | 1/1996 | Corrado et al. | 280/735 |
| 5,498,028 | 3/1996 | Carlin et al. | 280/735 |
| 5,587,906 | 12/1996 | McIver et al. | 364/424.045 |

*Primary Examiner*—Kevin J. Teska
*Assistant Examiner*—Russell W. Frejd
*Attorney, Agent, or Firm*—Tarolli, Sundheim, Covell, Tummino & Szabo

[57] ABSTRACT

An actuatable restraint system (10) includes a satellite crash sensing module (20) which is electrically connected to, and remotely located away from, a main module (22). Satellite crash sensing module (20) includes an accelerometer (26) and satellite controller (28). Satellite controller (28) determines whether a deployment crash event is occurring in response to the acceleration signal by performing a crash algorithm. Satellite controller (28) provides coded signals (63) indicating whether or not a deployment crash event has occurred. A main controller (44) in main control module (22) receives and interprets the coded signals (63). If main controller (44) interprets the coded signal as indicating the occurrence of a deployment crash condition, main controller (44) actuates a restraint device.

18 Claims, 3 Drawing Sheets

APPARATUS AND METHOD FOR
CONTROLLING AN ACTUATABLE
RESTRAINT DEVICE

TECHNICAL FIELD

The present invention is directed to a vehicle occupant restraint system and is particularly directed to a method and apparatus for controlling actuation of a restraint device.

BACKGROUND OF THE INVENTION

Actuatable occupant restraint systems for vehicles are well known in the art. One particular type of actuatable occupant restraint system includes an inflatable air bag mounted within the occupant compartment of the vehicle. The air bag has an associated electrically actuatable ignitor, referred to as a squib. Such systems typically include a plurality of mechanical inertia sensing devices electrically connected in series with the squib and mounted at selected locations of the vehicle. The inertia sensing devices close in response to a certain level of crash intensity. "Crash acceleration" is that acceleration resulting from a sudden change in velocity of the vehicle during a crash event. When the inertia sensing devices close, an electric current of sufficient magnitude and duration passes through the squib to ignite the squib. The squib, when ignited, ignites a combustible, gas-generating composition and/or pierces a container of pressurized gas, either of which results in inflation of the air bag. Other actuatable restraints include seat belt pretensioners, actuatable knee bolsters, etc.

Still other known actuatable occupant restraint systems for vehicles include an electrical transducer or accelerometer for sensing vehicle crash acceleration. Such systems include a monitoring or evaluation circuit connected to the output of the accelerometer. The accelerometer provides an electrical signal having a characteristic functionally related to the change in the vehicle's velocity. The accelerometer signal is evaluated to determine whether a deployment crash event is occurring. The overall crash determining process is referred to in the art as "a crash algorithm." Each crash algorithm determines a crash value referred to as "a crash metric." Known metrics include crash velocity (determined by integration of the acceleration signal), crash displacement (determined by double integration of the acceleration signal), crash jerk (determined by differentiation of the acceleration signal), frequency component monitoring to determine the presence of certain frequency components in the acceleration signal, and/or crash energy (determined, for example, by squaring the acceleration signal). For any particular crash algorithm used, one or more determined crash metric values are typically compared against respective threshold values. If a threshold value is exceeded or if certain values, e.g., frequency components, are present, a determination is made that a deployment crash event is occurring.

Occupant restraint systems for protecting an occupant during a side impact of the vehicle are also known in the art. Side impact restraint systems typically include an air bag mounted in the vehicle door or in the arm rest adjacent the occupant. Known side restraint systems typically include switch contacts mounted to the outside skin of the door. When the door is crushed during a side impact, the switch is closed by the crushing effect of the outside skin and the air bag deployed.

Some side impact restraint systems use accelerometers and crash algorithms to discriminate between deployment and non-deployment side crash events. In such a system, it is desirable to locate the accelerometer at a specific location within the vehicle door. A microcomputer controller is typically used to calculate the crash metrics of the crash algorithm from the accelerometer signal. Typical there is not enough room at the desired door location to install a complete sensing and control arrangement. Furthermore, some side impact air bag systems have the air bag located in the vehicle seat. If the sensing system and controller are located in the vehicle door, such arrangement would require routing the high current wiring through the door hinge area.

In addition, the electrical signals from accelerometers are typically low amplitude, high frequency signals e.g., approximately 5 millivolts per "g". If transmitted through typical automotive wiring harnesses and connectors, from a location in the vehicle door to a microcomputer controller located within the passenger compartment of the vehicle, the low amplitude accelerometer signals may become contaminated by radio frequency interference (RFI) and electromagnetic interference (EMI).

SUMMARY OF THE INVENTION

The present invention provides a method and apparatus for controlling an actuatable restraining device of a vehicle using remotely located interconnected control modules.

In accordance with one aspect of the present invention, an apparatus for controlling an actuatable restraining device comprises a satellite crash sensing means including acceleration sensing means for providing a crash acceleration signal having a characteristic indicative of crash acceleration of the vehicle. The satellite crash sensing means further includes means for determining, in response to the crash acceleration signal, whether a deployment crash condition is occurring. The satellite crash sensing means provides a coded signal in response to a determined deployment crash condition. A main control means is remotely located from and operatively connected to the satellite crash sensing means. The main control means is further operatively connected to the restraining device. The main control means actuates the actuatable restraining means in response to the coded signal from the satellite crash sensing means.

In accordance with another aspect of the invention, a method of controlling an actuatable restraining device comprises the steps of sensing vehicle crash acceleration at a first location in the vehicle and providing crash acceleration signal having a characteristic indicative of crash acceleration of the vehicle. The method further includes the step of determining in response to the crash acceleration signal whether a deployment crash condition is occurring and providing a coded signal in response to the determining step to a second location remotely located from the first location and interpreting the coded signal at the second location. The method further includes the step of providing an actuation signal in response to the coded signal for deploying the restraining device.

BRIEF DESCRIPTION OF THE DRAWINGS

The foregoing and other features of the present invention will become apparent to those skilled in the art to which the present invention relates upon consideration of the following description of the invention with reference to the accompanying drawings, wherein.

DESCRIPTION OF PREFERRED EMBODIMENT

Figure 1:
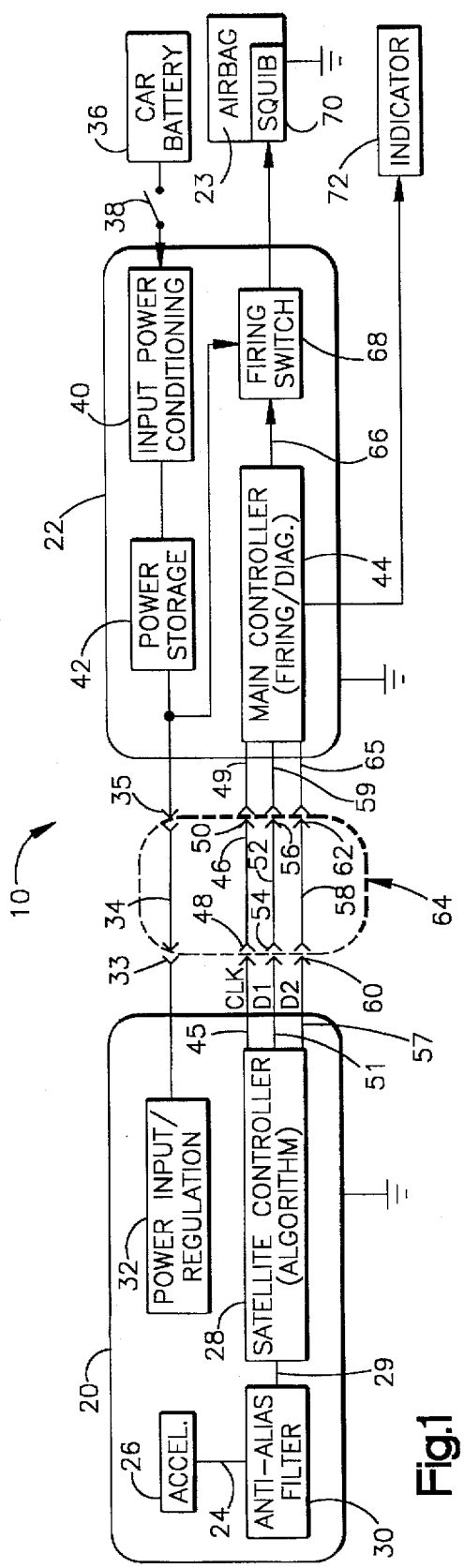
FIG. 1 is a functional block diagram of an actuatable restraint system made in accordance with the present invention.

Referring to FIG. 1, an actuatable occupant restraint system 10, made in accordance with the present invention, includes a satellite crash sensing module 20 electrically connected to, and remotely located from, a main control module 22. Main control module 22 is controllably connected to at least one actuatable restraining device 23. In response to signals received from satellite crash sensing module 20, main control module 22 controls the restraining device 23. More than one satellite crash sensing module may be operatively connected to a single main control module and the main control module can, in turn, control more than one actuatable restraining device. For simplicity of explanation, however, only one satellite crash sensing module 20 and one restraining device 23 are shown connected to main control module 22.

Satellite crash sensing module 20 is mountable to a vehicle at any one of several locations. If the restraint system 10 is a side restraint system, the satellite crash sensing module 20 is preferably mounted to the inside of a side door panel (not shown) associated with that restraint. The restraining device 23 may be an air bag mounted so as to restrain sideways movement of the vehicle occupant. The air bag 23 may be mounted in a side door or in the occupant seat.

The satellite crash sensing module 20 includes an accelerometer 26 operatively mounted to the vehicle so as to provide an electric signal having a characteristic indicative of vehicle crash acceleration. "Crash acceleration" is acceleration of the vehicle as a result of a crash event. Accelerometer 26 is preferably directionally responsive. If the accelerometer 26 is to monitor sideways acceleration of the vehicle, the accelerometer's sensitivity axis is oriented perpendicular to the fore and aft direction of vehicle. If the vehicle is subjected to a collision from a head-on direction, the accelerometer mounted in a side door does not provide a significant output signal.

An output 4 of accelerometer 26 is electrically connected to a satellite controller 28 through a low-pass or anti-alias filter 30. An output 29 of anti-alias filter 30 is connected to an A/D converter input of satellite controller 28. Preferably, satellite controller 28 is a microcomputer having (i) internal memory such as random access memory (RAM) and program memory, (ii) a central processing unit (CPU), and (iii) an internal analog-to-digital ("A/D") converter.

Satellite crash sensing module 20 further includes a power regulator 32 electrically connected to a source of electrical power 36 either directly through an ignition switch 38 or through the main controller 22. Power regulator 32 provides regulated power to satellite crash sensing module 20. In accordance with one embodiment of the present invention, a positive terminal (not shown) of a vehicle battery 36 is electrically connected to the ignition switch 38. Ignition switch 38 is electrically connected to main control module 22. When switched to an ON position, ignition switch 38 connects electrical power to an input power conditioner 40 of the main control module 22. Input power conditioner 40 preferably includes an UP-converter providing main control module 22 with a source of electric energy at a higher voltage than battery 36. Input power conditioner 40 is electrically connected to a power storage device 42. Power storage device 42 is electrically connected to a main controller 44, and a normally open firing switch 68. Device 42 is also connected, through a connector 35, wire 34 of a wire harness 64, and a connector 33 to the power regulator 32 of the satellite crash sensing module 20. Power storage device 42 may be one or more storage capacitors.

An electrically actuatable firing switch 68 (e.g., a transistor) is operatively connected in series with squib 70 across the power storage device 42. Input power conditioner 40 charges storage device 42 with enough energy to, upon closure of switch 68, ignite squib 70. The main controller 44 controls the firing switch 68 through a control line 66. When the main controller 44 of the main control module 22 receives from the satellite crash sensing module 20 a signal indicative of a deployment crash condition, controller 44 closes electrically actuatable switch 68 to thereby actuate a squib 70 and thus deploy the actuatable restraint 23.

Main controller 44 also preferably includes a microcomputer. Satellite controller 28 provides three output signals to the main controller 44 through a wiring harness 64. The three signals are a clock signal and primary and secondary "fire" signals. Specifically, satellite controller 28 provides a clock signal ("CLK") to main controller 44 along a clock signal output 45. CLK output 45 is connected to controller 44 through a connector 48, wire 46 of wire harness 64, and a connector 50. The CLK signal 45 is provided to main controller 44 at an input terminal 49.

Satellite controller 28 provides a coded primary fire signal to main controller 44 along a primary fire signal ("D1") output 51. Primary fire signal output 51 is connected to controller 44 through a connector 54, wire 52 of wire harness 64, and a connector 56. The coded primary fire signal D1 is provided to main controller 44 at an input terminal 59.

Satellite controller 28 provides a coded secondary fire signal to main controller 44 along a secondary fire signal ("D2") output 57. Secondary fire signal output 57 is connected to the main controller through a connector 60, wire 58 of wire harness 64, and a connector 62. The coded secondary fire signal D2 is provided to main controller 44 at an input terminal 65.

The coded signals CLK, D1, and D2 are hereinafter collectively referred to as satellite controller output signals 63. Wires 34, 46, 52, and 58, form the wiring harness 64. Preferably, satellite controller 20 outputs CLK, D1, and D2 signals in which each of these signals preferably has a pulse repetition frequency of less than 10 kHz.

Main controller 44 receives and interprets satellite controller output signals 63, i.e., the CLK, D1, and D2 signals, transmitted through the wiring harness 64. As mentioned, the output 66 of main controller 44 is controllably connected to firing switch 68. Preferably, switch 68 is a field effect transistor ("FET"). Firing switch 68 is electrically connected in series with squib 70 across a source of electrical energy in a manner known in the art.

An indicator 72, such as a light, is electrically connected to main controller 44. Indicator 72 is located in the passenger compartment of a vehicle, in the view of the operator. Main controller 44, in addition to controlling switch 68, also performs diagnostic tests and activates indicator 72 if an error condition is detected. Controller 44 also provides a coded error signal to a non-volatile memory such as an EEPROM, for retrieval during vehicle maintenance. Main controller 44 performs known diagnostic functions such as squib operativeness tests, energy storage device tests, etc. Special diagnostic tests relative to the satellite crash sensing module 20 are also performed. These special diagnostic tests are described below.

Upon the occurrence of a crash condition, accelerometer 26 provides a crash acceleration signal to satellite controller 28. Satellite controller 28 analyzes the signal to determine whether a deployment crash condition is occurring. To make this determination, controller 28 performs an algorithm on the acceleration signal. Crash algorithms for discrimination between deployment and non-deployment crash events are known in the art. Crash algorithms typically include a determination of a crash metric value such as crash velocity, crash jerk, crash acceleration squared, i.e., crash energy, etc. If the determined crash metric value is greater than a threshold value, a deployment crash condition is considered to be occurring. Upon determination of a deployment crash condition, the crash sensing module 20 outputs appropriate signals CLK, D1 and D2 to signal the desire to actuate the restraint device. The crash discrimination algorithms may not only discriminate between deployment and non-deployment crash events but can also control the timing of restraint actuation and/or gas pressure in the air bag.

The algorithm used by satellite controller 28 may be any one, or any combination, of a number of the known crash discrimination algorithms. If satellite controller 28 determines a deployment crash condition is occurring, satellite controller 28 provides coded deployment crash condition signals to main controller 44. Main controller 44 monitors the satellite controller output signals for an indication of the occurrence of a deployment crash condition. Upon the receipt of the coded deployment crash condition signals, main controller 44 actuates firing switch 68 to an ON condition. Sufficient electrical current then passes through squib 70 for a time period sufficient to ignite the squib. The squib 70, in turn, ignites a gas generating material and/or pierces a container of pressurized fluid to thereby inflate an air bag. It will be appreciated that the actuatable restraint is not limited to air bags and may be any one of a number of actuatable restraining devices, e.g. a front impact air bag, a side impact air bag, a seat belt pretensioner, an actuatable knee bolster, a seat belt lock, etc.

During normal vehicle operation, i.e., so long as no deployment crash condition is occurring, satellite controller 28 outputs coded signals indicative of such normal operation. These coded non-deployment signals are also used for testing the satellite crash sensing module 20 in a manner described below.

Figure 2:
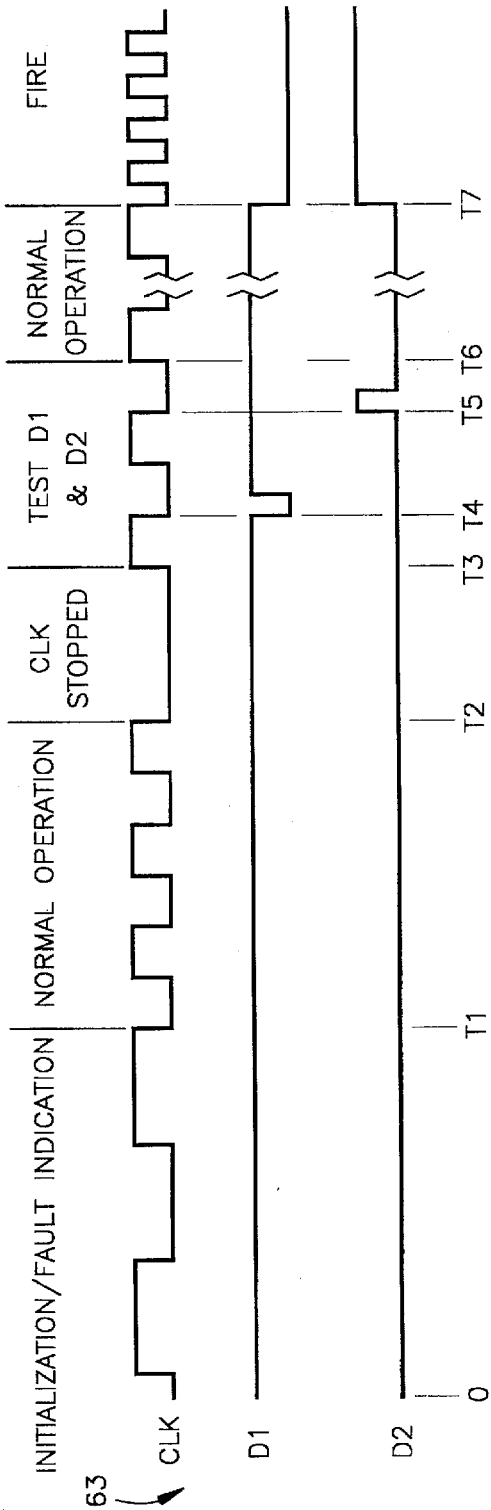
FIG. 2 is a graphical representation of signals present in the restraint system of FIG. 1.
Figure 3:
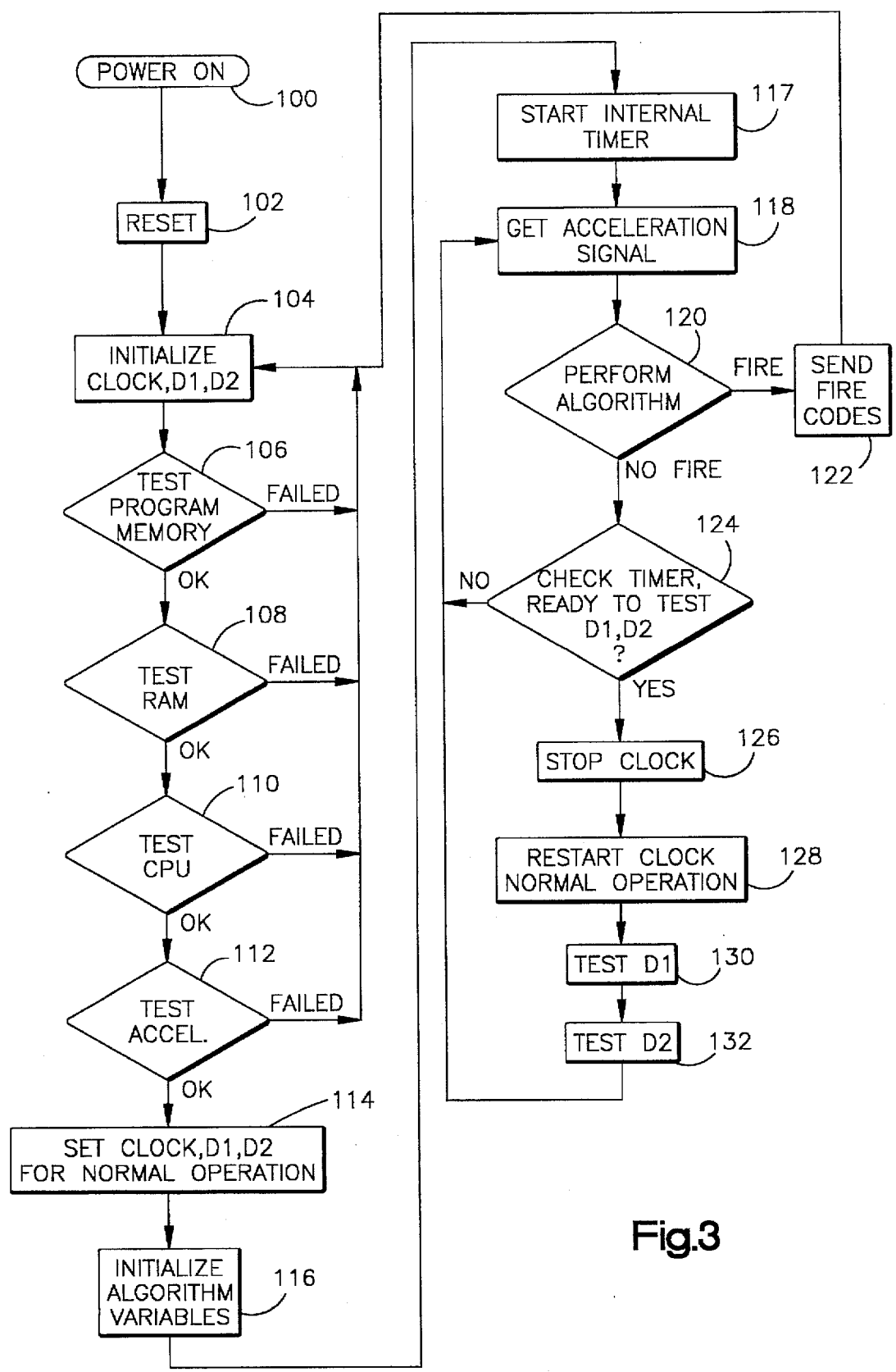
FIG. 3 is a flow diagram showing the control process used by the satellite controller 28 shown in FIG. 1.

The control process performed by satellite controller 28, in accordance with a preferred embodiment of the present invention, will be better appreciated through reference FIGS. 2 and 3. In step 100, vehicle ignition switch 38 is turned ON. In step 102, a reset step is performed. This reset occurs at each start-up of the vehicle engine. The process then proceeds to step 104, where satellite controller 28 sets CLK, D1, and D2 to initial values.

Referring specifically to FIG. 2, the outputs of D1, D2 and CLK are shown as a function of time. During the time period between 0 and T1, the CLK signal is initially set to provide an initialization/fault indication square wave signal having a frequency of 200 Hz; D1 is set to provide a continuous 5 v signal (corresponding to a digital HIGH value); and D2 is set to provide a continuous 0 v signal (corresponding to a digital LOW value). These are the initialization conditions set in step 104.

After the initialization step 104, several initial diagnostic steps are performed. In step 106, the program memory of satellite controller 28 is tested. If the program memory diagnostic test fails, the process returns to step 104. If the program memory test passes, the process proceeds to step 108. In step 108, the random access memory (RAM) of satellite controller 28 is tested. If the RAM diagnostic test fails, the process returns to step 104. If the RAM test passes, the process proceeds to step 110. Program memory and RAM memory diagnostic tests are well known in the art and are, therefore, not described in detail herein.

In step 110, the central processing unit (CPU) of satellite controller 28 is tested using known techniques. If the CPU diagnostic test fails, the process returns to step 104. If the CPU diagnostic test passes, the process proceeds to step 112. In step 112, accelerometer 26 is tested using a known method. If the accelerometer test fails, the process returns to step 104. If the accelerometer test passes, the process proceeds to step 114.

If the satellite controller fails any of the previously described diagnostic tests in steps 106, 108, 110, 112, the system continues to loop back to step 104. Therefore, the CLK signal remains at its initialization/fault indication frequency of 200 Hz. Main controller 44 monitors the CLK signal. If the CLK signal is not raised to the normal operating frequency of 1,000 Hz within a predetermined time period, main controller 44 interprets the continued CLK signal frequency of 200 Hz as indicating a fault condition in satellite controller 28. Main controller 44 then actuates indicator 72 to indicate the fault condition.

In step 114, satellite control output signals 63 are set for normal operation. Referring to FIG. 2, the initialization period, i.e., the time needed to complete steps 104–112, ends at time T1. The period between T1 and T2, is referred to as the normal operation period, i.e., that time period in which the satellite crash sensing module 20 is monitoring for the occurrence of a crash condition. At time T1, the CLK output frequency is raised from 200 Hz to 1,000 Hz by controller 28. At T1, primary fire signal output signal (D1) remains set at 5 v (HIGH) and secondary output fire signal (D2) remains set at 0 v (LOW). The process then proceeds to step 116 where initial values needed to perform a crash algorithm are set.

The process proceeds from 116 to step 117 where a timer internal to controller 28 is started. This internal timer is used by controller 28 to periodically initiate a diagnostic test process described below. From step 117, the process proceeds to step 118. Recall that the filtered acceleration signal is converted by an internal A/D converter of controller 28 to a digital signal. In step 118, satellite controller 28 fetches from the converter a value of the converted acceleration signal. The process then proceeds to step 120 where satellite controller 28 performs the crash algorithm upon the current and previous acceleration values to determine whether a deployment crash is occurring.

Referring to step 120, if the determination is affirmative, indicating the occurrence of a deployment crash condition as determined by controller 28, the process proceeds to step 122. In step 122, a fire code is provided by satellite controller 28 to main controller 44 using satellite control output signals 63. This is shown in FIG. 2 at time T7.

If the determination in step 120 is negative, indicating that a deployment crash condition has not been detected, the process proceeds to step 124. In step 124, a determination is made as to whether a predetermined time period has elapsed since the timer was started in step 117. The internal timer first times out at time T2 (see FIG. 2). If the determination is negative (i.e., time T2 has not arrived), the process returns to step 118 to fetch another acceleration value. If the determination is step 124 is affirmative (i.e., at time T2), the diagnostic timer is reset and the process proceeds to step 126. In step 126, a diagnostic sequence is initiated for testing primary fire signal output 51 (D1) and secondary fire signal output 57 (D2).

In step 126, as shown in FIG. 2, the clock output signal CLK is stopped, i.e., held at a digital LOW, at T2 for a predetermined time period, e.g., 5 milliseconds (ms). At the conclusion of this period (i.e., at time T3), the process proceeds to step 128. In step 128, the clock output signal CLK is restarted at its normal predetermined frequency of 1,000 Hz. The stopping of the clock frequency for a predetermined time period, once the clock frequency has been raised to its normal operation frequency, is a signal to the controller 44 that a diagnostic test of D1 and D2 is being initiated.

The process then proceeds to step 130, where primary fire signal output 51 (D1), at time T4 is set LOW for a predetermined time period, e.g., 50 micro-seconds, then back to HIGH. The main controller 44 monitors the line D1 at time T4. An internal timer (not shown) of main controller 44 starts to time out when CLK begins to provide its clock frequency after the CLK stop sequence at time T3. At time T4, the controller 44 checks to verify that D1 switches LOW and back to a HIGH after the predetermined time period. If the controller 44 does not see this switch in the state of D1, it sets an internal D1 failure flag. This process will be described with respect to FIG. 4.

The process performed by the secondary controller next proceeds to step 132. In step 132, secondary fire signal output 57 (D2), at time T5 is set HIGH for a predetermined time period, e.g., 50 micro-seconds, then back to LOW. The main controller 44 monitors the line D2 at time T5. The main controller "knows" when T5 occurs using its internal timer timing out from when CLK resumed the 1,000 Hz clock frequency. At time T5, the controller 44 checks to verify that D2 switches to a digital HIGH and back to a LOW after a predetermined time period. If the controller 44 does not see this switch in the state of D2, it sets an internal D2 failure flag. This process will be described with respect to FIG. 4.

After time T6, the secondary controller system resumes its normal operation with CLK, D1, and D2 set at their normal operating state.

Figure 4:
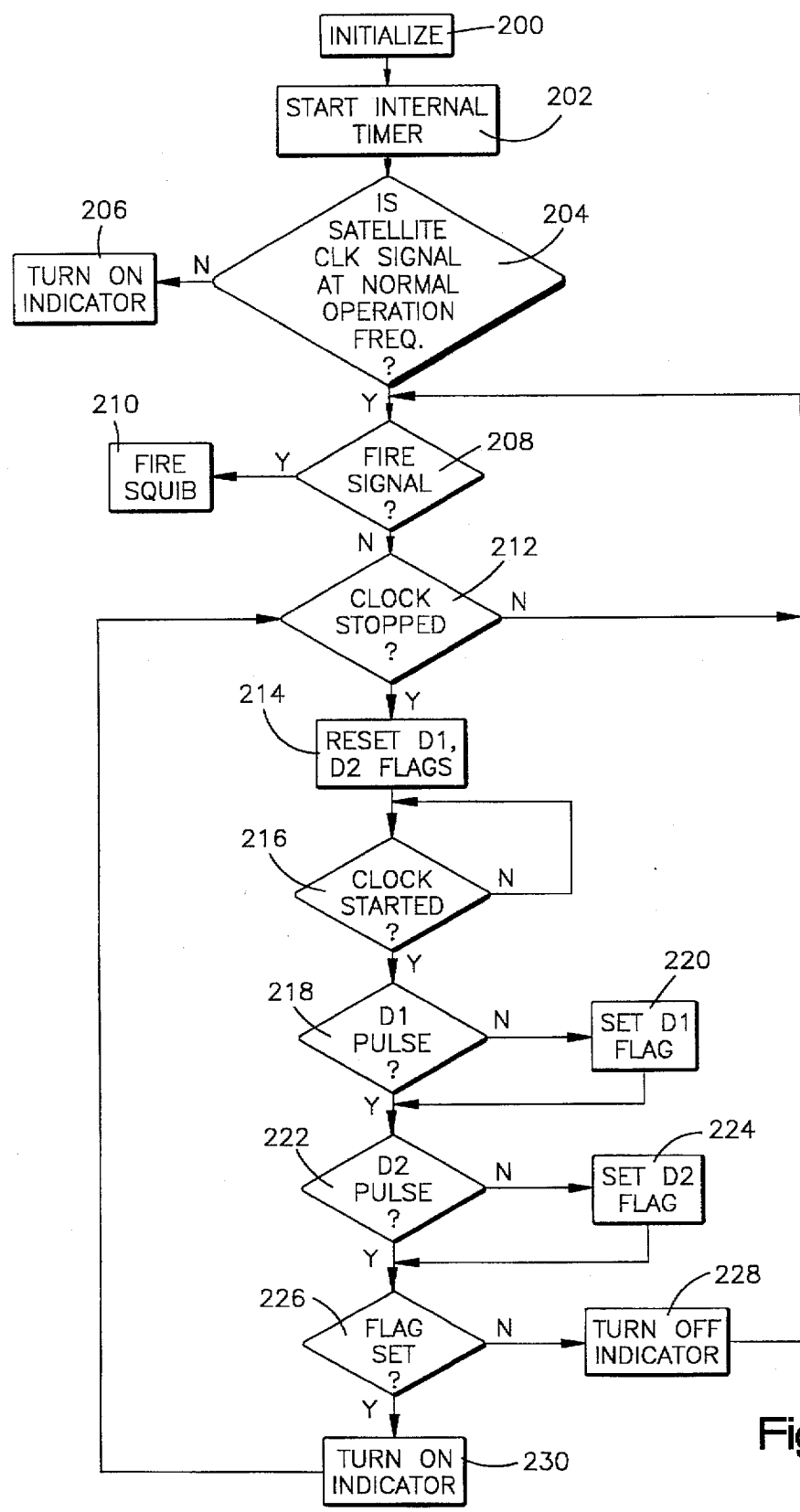
FIG. 4 is a flow diagram showing the control process used by the main controller 44 shown in FIG. 1.

Referring to FIG. 4, the control process performed by main controller 44, in accordance with a preferred embodiment of the present invention, will be better appreciated. An initialization step is performed in step 200 in which internal memories, timers, etc., are reset to initial values and main controller 44 begins monitoring the satellite controller CLK signal. This reset occurs at each start-up of the vehicle engine.

After the initialization step 200, the internal timer of main controller 44 starts to time out when CLK begins to provide its initialization/fault indication clock frequency i.e. 200 Hz, at time 0 in FIG. 2. The process then proceeds to step 204. In step 204, main controller 44 determines whether the CLK signal from satellite controller 28 has been raised from the 200 Hz initialization/fault indication frequency to the 1,000 Hz normal operation frequency within a predetermined time period, as indicated by T1 in FIG. 2. If the determination is negative, the process proceeds to step 206 where main controller 44 interprets continued transmission of the 200 Hz initialization/fault indication CLK frequency as indicating a failure of at least one of the satellite controller diagnostic tests in steps 106, 108, 110, 112 shown in FIG. 3. Main controller 44 then turns on indicator 72. If the determination is affirmative, i.e. CLK output frequency is raised to 1,000 Hz, the process proceeds to step 208.

In step 208, main controller 44 determines whether satellite controller 28 has provided fire codes from step 122 in FIG. 3. If the determination is affirmative, the process proceeds to step 210 where main controller 44 actuates firing switch 68, thereby igniting squib 70 and deploying air bag 23. If the determination in step 208 is negative, i.e. no fire codes received from satellite controller 28, the process proceeds to step 212.

In step 212, a determination is made as to whether the CLK signal has stopped as shown at T2 in FIG. 2. If the determination is negative, the process loops back to step 208. If the determination is affirmative, the main controller internal timer begins a time out at T2 and the process proceeds to step 214 where flags D1 and D2 are reset. In step 216, a determination is made as to whether the CLK signal has restarted as shown by T3 in FIG. 2. If the determination is negative, the process loops back upon step 216. If the determination is affirmative, i.e. CLK has restarted, the process proceeds to step 218.

In step 218, a determination is made by main controller 44 checking to verify that D1 switches LOW and back to HIGH after the predetermined time period as seen at time T4 in FIG. 2. If the determination is negative, the process proceeds to step 220 where internal D1 failure flag is set. The process then proceeds to step 222. If the determination in step 218 is affirmative, i.e. D1 switches to LOW then back to HIGH, the process proceeds to step 222.

In step 222, a determination is made by main controller 44 checking to verify that D2 switches HIGH and back to LOW after the predetermined time period as seen at time T5 in FIG. 2. If the determination is negative, the process proceeds to step 224 where internal D2 failure flag is set. The process then proceeds to step 226. If the determination in step 222 is affirmative, i.e. D2 switches to HIGH then back to LOW, the process proceeds to step 226.

In step 226, a determination is made as to whether either the internal D1 fault flag (step 220) or the internal D2 fault flag (step 224) is set. If the determination is negative, i.e. neither internal fault flag is set, the process proceeds to step 228 where main controller 44 turns off indicator 72. The process then loops back to step 208. If the determination in step 226 is affirmative, i.e. one of the internal fault flags D1 or D2 is set, the process proceeds to step 230 where main controller 44 actuates indicator 72. The process then loops back to step 212 where main controller 44 continues to monitor the CLK signal from satellite controller 28 to determine whether another periodic diagnostic test process of D1 and D2 is being initiated. The main controller diagnostic test process described above is continuously repeated.

Upon the detection of a deployment crash event, satellite controller 28 provides a fire code by (i) increasing the clock output signal (CLK) frequency to 5,000 Hz, (ii) switching the primary fire signal output (D1) from its normal HIGH state to a continuous LOW state, and (iii) switching the secondary fire signal output (D2) from its normal LOW state to a continuous HIGH state. Referring to FIG. 4, in step 208, main controller 44 interprets the occurrence of these signals as a fire condition. Main controller 44 then actuates the occupant restraint in step 210 by actuating switch 68 ON.

In accordance with a preferred embodiment of the present invention, both the switched states of D1 and D2 do not have to occur for controller 44 to actuate the squib. Main controller 44 preferably interprets as a fire condition a change of state in either D1 or D2, when coupled with a change in frequency of clock output 45 (CLK) to 5,000 Hz. In an alternative embodiment, the main controller 44 may be configured to interpret as a fire condition the occurrence of any two of the three satellite control output signals 63.

From the above description of the invention, those skilled in the art will perceive improvements, changes and modifications. Such improvements, changes, and modifications within the skill of the art are intended to be covered by the appended claims.

Having described the invention, the following is claimed:

1. An apparatus for controlling an actuatable restraining device, said apparatus comprising:

satellite crash sensing means including acceleration sensing means for providing a crash acceleration signal having a characteristic indicative of crash acceleration of the vehicle, said satellite crash sensing means further including determining means for determining, in response to said crash acceleration signal, whether a deployment crash condition is occurring, said satellite crash sensing means including means for providing a coded signal in response to a determined deployment crash condition; and main control means remotely located from and operatively connected to said satellite crash sensing means and to said restraining device, said main control means actuating said actuatable restraining device in response to said coded signal from said satellite crash sensing means.

2. The apparatus of claim 1 wherein said satellite crash sensing means provides a first coded signal when no deployment crash condition occurs and provides a second coded signal when a deployment crash condition occurs.

3. The apparatus of claim 2 wherein said first coded signal includes two digital outputs having first and second states during a non-deployment condition and third and fourth states during a deployment condition.

4. The apparatus of claim 2 wherein said first coded signal is a clock signal having a first frequency during non-deployment conditions and a second frequency during deployment conditions.

5. The apparatus of claim 2 wherein said first coded signal is a clock signal having a first frequency during non-deployment conditions and a second frequency during deployment conditions and wherein said second signal has a first digital state during a non-deployment condition and a second digital state during a deployment condition.

6. An apparatus for controlling an actuatable restraining device, said apparatus comprising:

satellite crash sensing means including acceleration sensing means for providing a crash acceleration signal having a characteristic indicative of crash acceleration of the vehicle, said satellite crash sensing means further including determining means for determining, in response to said crash acceleration signal, whether a deployment crash condition is occurring, said satellite crash sensing means including means for providing a coded signal in response to a determined deployment crash condition; and main control means remotely located from and operatively connected to said satellite crash sensing means and to said restraining device, said main control means actuating said actuatable restraining device in response to said coded signal from said satellite crash sensing means;

said satellite crash sensing means providing a first coded signal when no deployment crash condition occurs and providing a second coded signal when a deployment crash condition occurs, said first coded signal being a clock signal having a first frequency during non-deployment conditions and as second frequency during deployment conditions, and said second signal including two digital signals having opposite digital states during a non-deployment condition and each switching its associated digital states upon the occurrence of a deployment crash condition.

7. The apparatus of claim 1 wherein said satellite crash sensing means includes means for providing a coded diagnostic signal and wherein said main control means includes means for receiving and interpreting said coded diagnostic signal, said apparatus further including indicator means coupled to said main control means, said main control means actuating said indicator means when said diagnostic signal indicates a fault condition.

8. The apparatus of claim 7 wherein said means for providing said coded diagnostic signal includes means for periodically providing said coded diagnostic signal.

9. The apparatus of claim 8 wherein said means for periodically providing said coded diagnostic signal includes means for signalling said main controller that a signal being sent from said satellite crash sensing means is a diagnostic signal.

10. An apparatus for controlling an actuatable restraining device, said apparatus comprising:

satellite crash sensing means including acceleration sensing means for providing a crash acceleration signal having a characteristic indicative of crash acceleration of the vehicle, said satellite crash sensing means further including determining means for determining, in response to said crash acceleration signal, whether a deployment crash condition is occurring, said satellite crash sensing means including means for providing a coded signal in response to a determined deployment crash condition; and main control means remotely located from and operatively connected to said satellite crash sensing means and to said restraining device, said main control means actuating said actuatable restraining device in response to said coded signal from said satellite crash sensing means;

said satellite crash sensing means including means for providing a coded diagnostic signal, said means for providing said coded diagnostic signal including means for periodically providing said coded diagnostic signal, said means for periodically providing said coded diagnostic signal including means for signaling said main controller that a signal being sent from said satellite crash sensing means is a diagnostic signal, said main control means including means for receiving and interpreting said coded diagnostic signal;

said apparatus further including indicator means coupled to said main control means, said main control means actuating said indicator means when said diagnostic signal indicates a fault condition, said means for signaling said main controller including means for providing a first signal having a normal operating frequency during periods when no coded diagnostic signal is provided and said means for signaling said main controller stops oscillation of said first signal for a predetermined time period.

11. The apparatus of claim 10 wherein said means for providing a coded signal of said satellite crash means includes means for providing first and second fire control signals having continuous digital states during a non-deployment crash condition and wherein said means for providing said coded diagnostic signal includes means for toggling said first and second fire control signals after said main controller stops oscillation of said first signal.

12. A method of controlling an actuatable restraining device, said method comprising the steps of:

sensing crash acceleration at a first location in said vehicle and providing a crash acceleration signal having a characteristic indicative of crash acceleration of the vehicle;

determining in response to said crash acceleration signal whether a deployment crash condition is occurring;

providing a coded signal to a second location remotely located from said first location in response to said determining step;

interpreting said coded signal at said second location; and providing an actuation signal in response to said coded signal for deploying said restraining device.

13. The method of claim 12 wherein said step of determining includes providing a first coded signal when no deployment crash condition occurs and providing a second coded signal when a deployment crash condition occurs.

14. The method of claim 12 wherein said step of providing a coded signal includes providing a clock signal having a first predetermined frequency, a first digital signal having a first digital state and a second digital signal having a second digital state.

15. A method of controlling an actuatable restraining device, said method comprising the steps of:

sensing crash acceleration at a first location in said vehicle and providing a crash acceleration signal having a characteristic indicative of crash acceleration of the vehicle;

determining in response to said crash acceleration signal whether a deployment crash condition is occurring;

providing a coded signal to a second location remotely located from said first location in response to said determining step;

interpreting said coded signal at said second location; and providing an actuation signal in response to said coded signal for deploying said restraining device;

said step of providing a coded signal including providing a clock signal having a first predetermined frequency, a first digital signal having a first digital state and a second digital signal having a second digital state, said step of interpreting said coded signal including determining if said clock frequency has changed to a second predetermined value and determining if either said first digital signal or said second digital signal have changed states, said step of providing said actuation signal occurring when said clock frequency changes and either first or second digital signals changes state.

16. The method of claim 12 further including the steps of providing a coded diagnostic signal, receiving said coded diagnostic signal, and actuating an indicator when said coded diagnostic signal indicates a fault condition.

17. The method of claim 16 wherein said step of providing a coded diagnostic signal includes providing an indication to another controller that a signal being set is a diagnostic signal and further including the step of providing an indication to a vehicle operator upon an indication of a fault condition.

18. A method of controlling an actuatable restraining device said method comprising the steps of:

sensing crash acceleration at a first location in said vehicle and providing a crash acceleration signal having a characteristic indicative of crash acceleration of the vehicle;

determining in response to said crash acceleration signal whether a deployment crash condition is occurring;

providing a coded signal to a second location remotely located from said first location in response to said determining step;

interpreting said coded signal at said second location; and providing an actuation signal in response to said coded signal for deploying said restraining device;

providing a coded diagnostic signal;

receiving said coded diagnostic signal; and actuating an indicator when said coded diagnostic signal indicates a fault condition;

said step of providing a coded diagnostic signal including providing an indication to another controller that a signal being set is a diagnostic signal and further including the step of providing an indication to a vehicle operator upon an indication of a fault condition, said step of providing a coded diagnostic signal including providing first and second control signals having continuous digital states during non-deployment conditions, and toggling said first and second fire control signals after said clock frequency stops for a predetermined time period, said stopped clock frequency indicating the toggled first and second fire control signals are diagnostic signals.

* * * * *